United States Patent [19]
Gaston et al.

[11] Patent Number: 5,272,918
[45] Date of Patent: Dec. 28, 1993

[54] PIVOTAL LIQUID LEVEL SENSOR ASSEMBLY

[75] Inventors: Robert D. Gaston, Dearborn Heights; Kevin L. Hobson, Detroit, both of Mich.

[73] Assignee: Ford Motor Company, Dearborn, Mich.

[21] Appl. No.: 83,758

[22] Filed: Jun. 30, 1993

[51] Int. Cl.⁵ .................... G01F 23/00; G01F 23/36; G01F 23/68
[52] U.S. Cl. .................... 73/290 R; 73/317; 73/319
[58] Field of Search .................... 73/290 R, 317, 313, 73/319, 314

[56] References Cited

U.S. PATENT DOCUMENTS

| | | | |
|---|---|---|---|
| 3,449,955 | 6/1969 | Stadelmann | 73/313 |
| 3,925,747 | 12/1975 | Woodward et al. | 73/317 |
| 3,949,720 | 4/1976 | Zipprich et al. | 123/136 |
| 3,968,896 | 7/1976 | Giacoletti et al. | 220/63 R |
| 4,641,122 | 2/1987 | Hennequin | 73/317 |
| 4,706,707 | 11/1987 | Betterton et al. | 137/565 |
| 4,873,865 | 10/1989 | Gaston | 73/317 |
| 4,924,704 | 5/1990 | Gaston | 73/317 |
| 4,931,764 | 6/1990 | Gaston | 338/185 |
| 4,939,932 | 7/1990 | Ritzenthaler et al. | 73/317 |
| 4,945,884 | 8/1990 | Coha et al. | 123/509 |
| 4,991,436 | 2/1991 | Roling | 73/320 |
| 5,056,493 | 10/1991 | Holzer | 123/518 |
| 5,072,615 | 12/1991 | Nawrocki | 73/291 |
| 5,152,170 | 10/1992 | Liu | 73/317 |

FOREIGN PATENT DOCUMENTS

| | | | |
|---|---|---|---|
| 0249542 | 12/1987 | European Pat. Off. | 73/290 R |
| 4113509 | 10/1992 | Fed. Rep. of Germany | 73/314 |
| 0284632 | 9/1929 | United Kingdom | 73/314 |

Primary Examiner—William A. Cuchlinski, Jr.
Assistant Examiner—Diego F. F. Gutierrez
Attorney, Agent, or Firm—Roger L. May; Richard D. Dixon

[57] ABSTRACT

A sensor assembly is provided for determining the level of liquid, such as fuel, in a tank such as a motor vehicle fuel tank. A mounting bracket has a support end adapted to be supported from the tank and also has a distal connection end. A liquid level sensor has lower and upper ends and a resistor element extending therebetween, and is connected to the connection end of the mounting bracket by a shaft. A torsional spring is disposed around the shaft, and biases the liquid level sensor from a retracted position and toward a deployed position. In the retracted position, the sensor assembly is insertable through an access hole in the tank. In the deployed position, the upper end of the liquid level sensor is disposed generally above the shaft and the resistor element is disposed generally vertically to provide the greatest resolution possible with both linear and angular sweep floats.

19 Claims, 3 Drawing Sheets

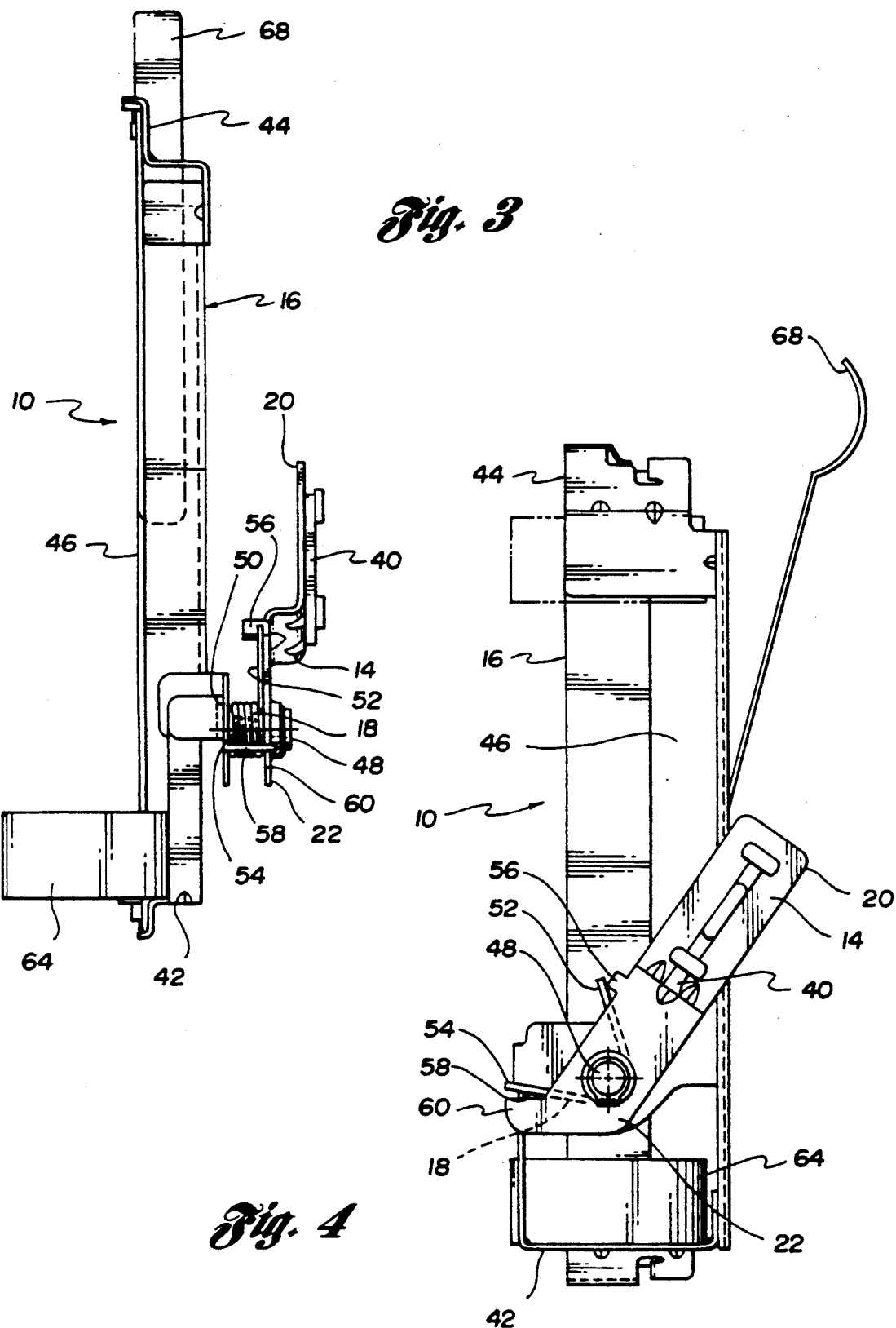

PIVOTAL LIQUID LEVEL SENSOR ASSEMBLY

TECHNICAL FIELD

This invention relates to liquid level sensors for motor vehicles.

BACKGROUND ART

Many devices exist for measuring the amount of fuel remaining in the fuel tank of a motor vehicle. Fuel level sensors for this purpose are typically either of an angular sweep type or a vertical sweep type. In the angular sweep fuel level sensor, a float is connected to one end of a pivoted float arm which rises or falls as the fuel level varies, while the other end of the float arm sweeps an arcuate path across a resistor element. In the vertical sweep fuel level sensor, the float travels linearly along a generally vertically disposed resistor element.

Both types of fuel level sensors are usually mounted for use by insertion through an access hole in the top or side of the fuel tank. Various assemblies have been proposed to ensure that the fuel level sensor, and the fuel pump it is often mounted with, are always in contact with the bottom of the fuel tank. For instance, U.S. Pat. No. 4,939,932 and U.S. Pat. No. 4,945,884 disclose constructions in which the lower end of the fuel level sensor assembly is urged against the bottom of the fuel tank. Because the shape and height of fuel tanks vary, however, a particular fuel level sensor design may not provide a float which is capable of traveling from the bottom to the top of the tank in all vehicles.

Fuel level sensors which are urged against the bottom of the fuel tank also often have a resulting angular orientation, which diminishes the resolution that is theoretically available. For example, the float arm of an angular sweep fuel level sensor may be restricted to something less than its full arc when the sensor is mounted at an angle to the bottom of the fuel tank. Furthermore, angular sweep fuel level sensors, which generally require more free working area than vertical sweep fuel level sensors, are susceptible to interference from deflatable bladders which are increasingly prevalent on motor vehicles.

SUMMARY OF THE INVENTION

The present invention is a sensor assembly for determining the level of liquid, such as fuel, in a tank such as a motor vehicle fuel tank. The sensor assembly comprises a mounting bracket, a liquid level sensor, and a torsional spring engaging both the mounting bracket and the liquid level sensor. The mounting bracket has a support end adapted to be supported from the tank and also has a distal connection end. The liquid level sensor has lower and upper ends and a resistor element extending therebetween, and is connected to the connection end of the mounting bracket by a shaft. The torsional spring is disposed around the shaft, and biases the liquid level sensor from a retracted position for introducing the liquid level sensor into the tank and toward a deployed position for operation of the liquid level sensor.

In the retracted position, the sensor assembly is insertable through an access hole in the tank. In the deployed position, the upper end of the liquid level sensor is disposed generally above the shaft and the resistor element is disposed generally vertically. In this orientation, the liquid level sensor provides the greatest resolution possible with both linear and angular sweep floats.

Accordingly, it is an object of the present invention to provide a sensor assembly of the type described above which is operable in a wide variety of motor vehicle fuel tanks.

Another object of the present invention is to provide a sensor assembly of the type described above which includes either a vertical or an angular sweep liquid level sensor.

Another object of the present invention is to provide a sensor assembly of the type described above which allows a maximum fuel gauge resolution, particularly for angular sweep fuel level sensors.

These and other objects, features, and advantages of the present invention are readily apparent from the following detailed description of the best mode for carrying out the invention when taken in conjunction with the accompanying drawings.

BRIEF DESCRIPTION OF THE DRAWINGS

FIG. 3 is a front view of the sensor assembly;

FIG. 4 is a side view of the sensor assembly;

BEST MODE FOR CARRYING OUT THE INVENTION

Figure 1:
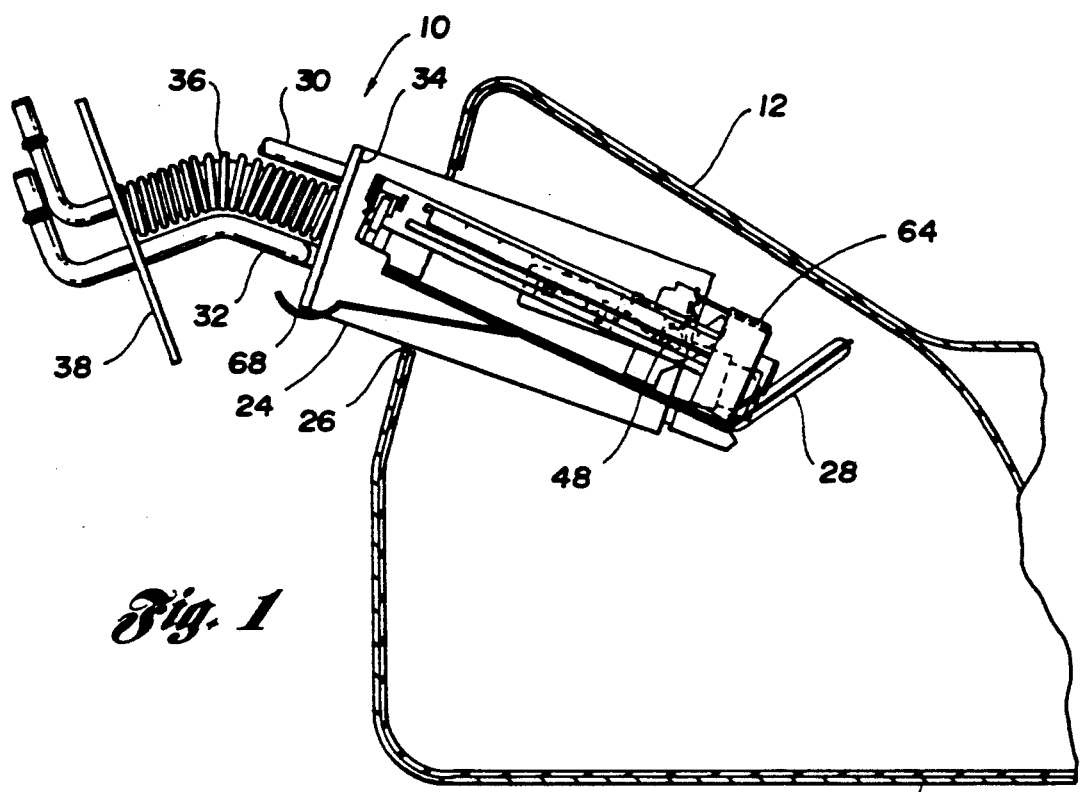
FIG. 1 is a side view of a sensor assembly according to the present invention in a retracted position for insertion into a motor vehicle fuel tank.

With reference to the drawings, the preferred embodiments of the present invention will be described. FIGS. 1 through 4 show a preferred embodiment of a sensor assembly 10 for determining the level or volume of liquid, such as fuel, remaining in a tank such as a fuel tank 12 of a motor vehicle. The sensor assembly 10 comprises a mounting bracket 14, a liquid level sensor 16, and a torsional spring 18.

Figure 2:
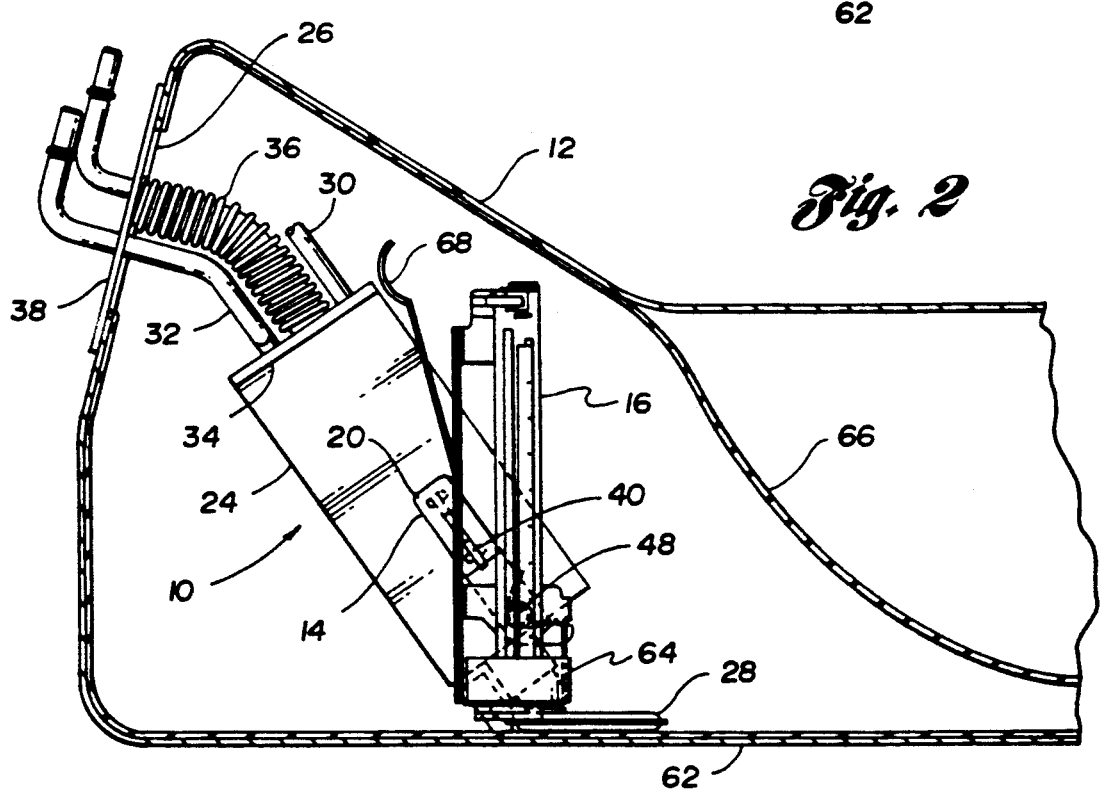
FIG. 2 is a side view of the sensor assembly in a deployed position in the fuel tank.

The mounting bracket 14 has a support end 20 and a distal connection end 22. The support end 20 is adapted to be supported from the tank 12, such as by attachment to a fuel delivery module 24. As best shown in FIG. 2, the location of the fuel delivery module 24 in a shallow portion of the fuel tank may necessitate its mounting at an angle through an access hole 26 in the top or side of the fuel tank. Depending on the available height of the tank, the angle at which the fuel delivery module 24 is mounted typically varies between 45 and 70 degrees.

The fuel delivery module 24 includes a fuel pump having a fuel filter 28 and feed lines 30 and 32. A hinged lid 34 is provided on the top of the fuel delivery module 24, and is connected to one end of a locating spring 36 which extends from a flange hole covering plate 38 adapted to be secured over the access hole 26. In a preferred embodiment, the mounting bracket 14 has means such as a projection 40 which is adapted to fit into a groove in the exterior of the fuel module delivery 24 for precisely locating the mounting bracket within the tank 12.

As shown in FIGS. 3 and 4, the vertical sweep liquid level sensor 16 has a lower end 42 and an upper end 44, between which is detachably mounted a resistor element 46 similar to the one disclosed in copending U.S. patent application Ser. No. 08/035,547, filed Mar. 23, 1993, assigned to the assignee of the present invention and hereby incorporated by reference. The resistor element 46 includes a conductive strip and a continuous pad resistive strip both located on one side of the resistor element. The strips are electrically connected to external electrical circuitry, which may include an analog or digital display gauge (not shown). A series of laser plunges or trim cuts are arranged on the resistive strip to provide a predetermined resistance characteristic at each point on the resistive strip. The resistance value at the bottom of the resistive strip is preferably about 15 ohms, with the resistance value at the top of the resistive strip being about 160 ohms. Any number of laser plunges may be made along the resistive strip by a laser trimming process such as the one described in U.S. Pat. No. 5,051,719, assigned to the assignee of the present invention and hereby incorporated by reference. Preferably, the laser plunges are made about every 2-4 ohms.

The liquid level sensor 16 is connected to the mounting bracket 14 by a shaft 48 which intersects the liquid level sensor at a pivot point 50, as best seen in FIG. 3. In the preferred embodiment shown in FIGS. 1 through 4, the mounting bracket 14 is connected by the shaft 48 to the liquid level sensor 16, proximate its lower end 42. It should be understood, however, that the pivot point 50 may be established intermediate the ends 42 and 44 of the liquid level sensor 16 depending on the available dimensions of the fuel tank 12. The torsional spring 18 is disposed around the shaft 48, and has winding ends 52 and 54 which respectively abut a stop 56 projecting from the connection end 22 of the mounting bracket 14 and a stop 58 projecting from the lower end 42 of the liquid level sensor 16.

The liquid level sensor 16 is pivotable about the shaft 48 relative to the mounting bracket 14 between a retracted position as shown in FIG. 1, and a deployed position as shown in FIG. 2. With the liquid level sensor 16 in the retracted position, the sensor assembly 10 is insertable through the access hole 26 in the tank 12. After the sensor assembly 10 clears the access hole 26, the torsional spring 18 forces the liquid level sensor 16 to rotate until a shoulder 60 formed on the lower end 22 of the mounting bracket 14 abuts the stop 58, thus biasing the liquid level sensor toward the deployed position. In the deployed position, the upper end 44 of the liquid level sensor 16 is disposed generally above the shaft 48.

In the deployed position, the resistor element 46 is preferably disposed generally vertically relative to a horizontal plane and, in most instances, relative to the planar bottom 62 of the fuel tank 12. A float 64 adapted for generally linear movement on the resistor element 46 is provided, and varies in height with the level of fuel remaining in the tank 12. The float 64 preferably includes a contact assembly having a pair of contacts which are respectively biased against the conductive strip and the resistive strip on the resistor element 46 to complete an electrical circuit with the external electrical circuitry. Because the liquid level sensor 16 has a linear sweep float rather than a pivotal float arm, it is well suited for operation in fuel tanks having an inflatable bladder such as vapor recovery liner 66 shown in FIG. 2. When used in such an application, the sensor assembly 10 may be provided with a bladder shield (not shown) to prevent the liner 66 from interfering with the liquid level sensor 16, a retraction handle 68, or any other component of the sensor assembly.

Figure 5:
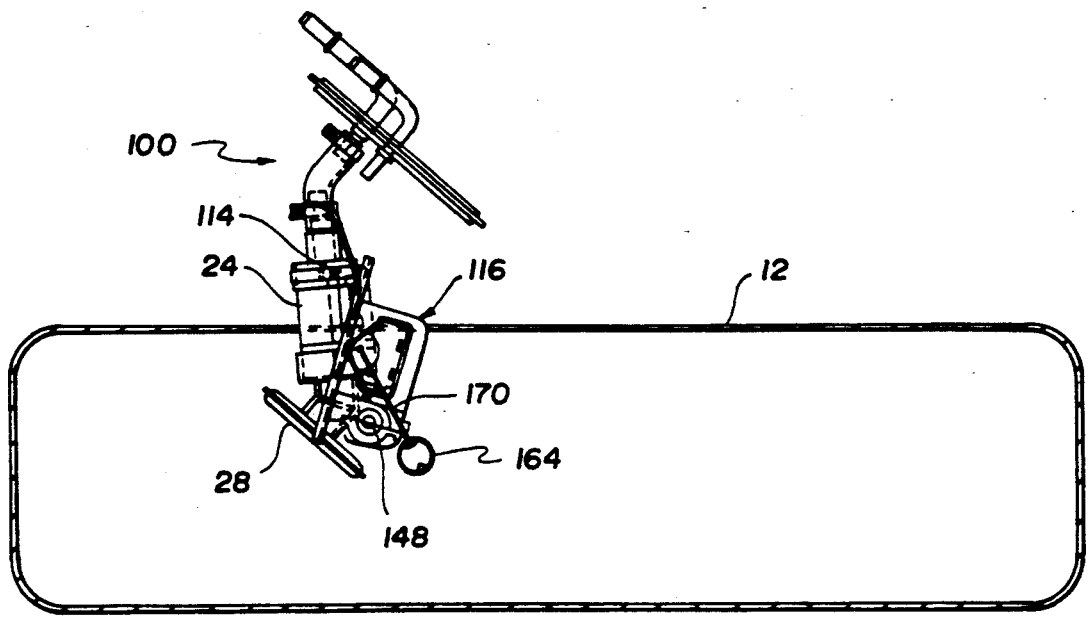
FIG. 5 is a side view of another embodiment of the sensor assembly including an angular sweep liquid level sensor in a retracted position.
Figure 6:
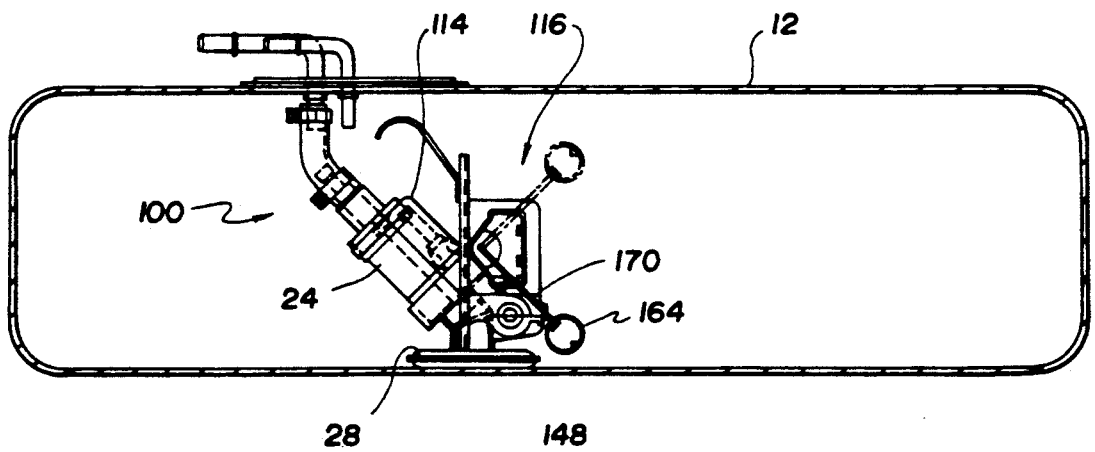
FIG. 6 is a side view of the sensor assembly shown in FIG. 5 in a deployed position.

FIGS. 5 and 6 show another embodiment 100 of the present invention including an angular sweep fuel level sensor 116, for instance one as described in U.S. Pat. No. 4,873,865 and U.S. Pat. No. 4,924,704, both of which are assigned to the assignee of the present invention and are hereby incorporated by reference. Sensor assembly 100 comprises a mounting bracket 114, the liquid level sensor 116, and a torsional spring disposed around a shaft 148 connecting the mounting bracket and the liquid level sensor. The mounting bracket 114 is preferably supported from the tank 12 by attachment to the fuel delivery module 24.

In the embodiment 100, a float 164 is connected to one end of a float arm 170 which travels as seen in FIG. 6 between the position shown in solid line when there is little or no fuel in the tank, and the position shown in phantom when the fuel tank is full. The other end of the float arm 170 moves a wiper contact over a resistor, as is well known. Electrical connections to the wiper contact and the resistor result in a variable measure of resistance as the float 164 moves in accordance with the level of fuel in the tank 12. A signal resulting from the variable resistance is sent to an indicator, such as a fuel gauge, to indicate to a vehicle operator the amount of fuel present in the tank. The liquid level sensor 116 preferably has a low wear resistor card as described in U.S. Pat. No. 4,931,764, assigned to the assignee of the present invention and hereby incorporated by reference.

The sensor assembly 100 improves the gauge resolution typically provided by conventional angular sweep assemblies because the float arm 164 may sweep out a 90 degree or more arc, as opposed to the 60-68 degree travel normally available when a liquid level sensor is mounted at an angle with the fuel delivery module 24. This increased clearance may proportionately increase gauge resolution so that a 50% improvement may be obtainable.

It should be understood that while the forms of the invention herein shown and described constitute preferred embodiments of the invention, they are not intended to illustrate all possible forms thereof. It should also be understood that the words used are words of description rather than limitation, and various changes may be made without departing from the spirit and scope of the invention disclosed.

We claim:

1. A sensor assembly for determining the level of liquid in a tank, the sensor assembly comprising:
    a mounting bracket having a support end supported from the tank and also having a distal connection end;
    a liquid level sensor having lower and upper ends and being connected to the mounting bracket at a pivot point, the liquid level sensor being pivotable between a retracted position for introducing the liquid level sensor into the tank and a deployed position for operation of the liquid level sensor, wherein, the upper end of the liquid level sensor is disposed generally above the pivot point; and
    spring means engaging both the mounting bracket and the liquid level sensor for biasing the liquid level sensor toward the deployed position.

2. The sensor assembly of claim 1 wherein the pivot point lies on a shaft extending between the mounting bracket and the liquid level sensor, and the spring means comprises a torsional spring disposed around the shaft.

3. The sensor assembly of claim 1 wherein the support end of the mounting bracket is attached to a fuel delivery module which is supported from the tank.

4. The sensor assembly of claim 1 wherein the liquid level sensor comprises a float adapted for generally linear movement.

5. The sensor assembly of claim 1 wherein the liquid level sensor comprises a float adapted for generally angular movement.

6. The sensor assembly of claim 5 wherein the float is adapted for generally angular movement through about 90 degrees.

7. The sensor assembly of claim 1 wherein the liquid level sensor is disposed generally vertically in the deployed position.

8. The sensor assembly of claim 1 wherein the sensor assembly is insertable through an access hole in the tank when the liquid level sensor is in the retracted position.

9. The sensor assembly of claim 1 wherein the upper end of the liquid level sensor in the deployed position is disposed generally above the lower end of the liquid level sensor.

10. The sensor assembly of claim 1 wherein the pivot point is proximate the lower end of the liquid level sensor.

11. A sensor assembly for determining the level of liquid in a tank, the sensor assembly comprising:
- a mounting bracket having a support end supported from the tank and also having a distal connection end;
- a liquid level sensor having lower and upper ends and a resistor element, the liquid level sensor being connected to the mounting bracket at a pivot point and pivotable between a retracted position for introducing the liquid level sensor into the tank and a deployed position for operation of the liquid level sensor, wherein the upper end of the liquid level sensor is disposed generally above the pivot point;
- a float adapted for generally linear movement on the resistor element; and
- spring means engaging both the mounting bracket and the liquid level sensor for biasing the liquid level sensor toward the delayed position.

12. The sensor assembly of claim 11 wherein the pivot point lies on a shaft extending between the mounting bracket and the liquid level sensor, and the spring means comprises a torsional spring disposed around the shaft.

13. The sensor assembly of claim 12 wherein the support end of the mounting bracket is attached to a fuel delivery module which is supported from the tank.

14. The sensor assembly of claim 11 wherein the liquid level sensor is disposed generally vertically in the deployed position.

15. The sensor assembly of claim 11 wherein the sensor assembly is insertable through an access hole in the tank when the liquid level sensor is in the retracted position.

16. The sensor assembly of claim 11 wherein the upper end of the liquid level sensor in the deployed position is disposed generally above the lower end of the liquid level sensor.

17. The sensor assembly of claim 11 wherein the pivot point is proximate the lower end of the liquid level sensor.

18. A sensor assembly for determining the level of fuel in a motor vehicle fuel tank, the sensor assembly comprising:
- a mounting bracket having a support end supported from the tank and also having a distal connection end;
- a liquid level sensor having lower and upper ends and a resistor element, the liquid level sensor being connected to the connection end of the mounting bracket by a shaft and being pivotable between a retracted position for introducing the liquid level sensor into the tank and a deployed position for operation of the liquid level sensor, wherein the upper end of the liquid level sensor is disposed generally above the shaft and the resistor element is disposed generally vertically;
- a float adapted for generally linear movement on the resistor element;
- a torsional spring means engaging both the mounting bracket and the liquid level sensor and disposed around the shaft for biasing the liquid level sensor toward the deployed position.

19. The sensor assembly of claim 18 wherein the sensor assembly is insertable through an access hole in the tank when the liquid level sensor is in the retracted position.

* * * * *